(12) United States Patent
Sun et al.

(10) Patent No.: US 8,083,189 B2
(45) Date of Patent: Dec. 27, 2011

(54) BRACKET FOR SCREEN EXPANSION, DISPLAY, AND DISPLAY ASSEMBLY

(75) Inventors: Zheng-Heng Sun, Taipei Hsien (TW); An-Gang Liang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/778,135

(22) Filed: May 12, 2010

(65) Prior Publication Data

US 2011/0155868 A1     Jun. 30, 2011

(30) Foreign Application Priority Data

Dec. 24, 2009   (CN) .......................... 2009 1 0312190

(51) Int. Cl.
    *A47F 5/00*     (2006.01)
(52) U.S. Cl. .................. 248/122.1; 248/917; 248/298.1; 361/679.04; 361/681; 361/825
(58) Field of Classification Search .................. 248/121, 248/122.1, 176.1, 158, 124.1, 298.1, 285.1, 248/125.2, 225.11, 917–920; 361/679–683, 361/679.01, 679.04, 679.41, 679.21, 679.22, 361/679.27, 679.28, 825, 829
See application file for complete search history.

(56) References Cited

U.S. PATENT DOCUMENTS

| | | | | |
|---|---|---|---|---|
| 1,682,180 A * | 8/1928 | Merrill | ........................... | 248/462 |
| 5,082,235 A * | 1/1992 | Crowther et al. | ........ | 248/231.41 |
| 5,904,328 A * | 5/1999 | Leveridge et al. | ......... | 248/124.1 |
| 5,984,249 A * | 11/1999 | Cohen | ...................... | 248/226.11 |
| 6,222,507 B1 * | 4/2001 | Gouko | ........................... | 345/1.1 |
| 6,343,006 B1 * | 1/2002 | Moscovitch et al. | .... | 361/679.04 |
| 6,419,198 B1 * | 7/2002 | Einav | ...................... | 248/346.07 |
| 7,529,083 B2 * | 5/2009 | Jeong | ....................... | 361/679.04 |
| 7,813,118 B2 * | 10/2010 | Burge | ...................... | 361/679.41 |
| D632,301 S * | 2/2011 | Kasuga et al. | ................ | D14/452 |
| 2003/0015632 A1 * | 1/2003 | Dunn et al. | ................. | 248/122.1 |
| 2004/0195471 A1 * | 10/2004 | Sachen, Jr. | .................... | 248/127 |
| 2009/0090825 A1 * | 4/2009 | Jung et al. | .................. | 248/205.1 |
| 2010/0128423 A1 * | 5/2010 | Moscovitch | ............. | 361/679.01 |

* cited by examiner

*Primary Examiner* — Tan Le

(74) *Attorney, Agent, or Firm* — Altis Law Group, Inc.

(57) ABSTRACT

A bracket for screen expansion includes a first arm, and a second arm. The first arm includes a first main body extending horizontally. Two horizontally spaced first assembling holes are defined in the first main body. The second arm is horizontally rotatably mounted to the first arm. The second arm includes a second main body extending horizontally. Two horizontally spaced second assembling holes are defined in the second main body. The brackets, to achieve screen expansion may be connected to a number of displays.

6 Claims, 7 Drawing Sheets

BRACKET FOR SCREEN EXPANSION, DISPLAY, AND DISPLAY ASSEMBLY

BACKGROUND

1. Technical Field

The present disclosure relates to displays.

2. Description of Related Art

Processing capability of computers has rapidly advanced, and therefore people can receive more and more information from computers. A screen of a display is the main interface for people to get information from a computer. When a user is dealing with many tasks depending on a computer, a number of windows may be opened simultaneously. However, because of the limitation of the size of the computer screen, it is hard to view as many windows as desired.

A solution for solving the problem mentioned above is to provide another display with a wider screen, instead of the display with a small screen. However, a display with a wide screen is more expensive. Furthermore, discarding the displays with a small screen as useless is wasteful, especially for a corporation with a large number of such displays.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
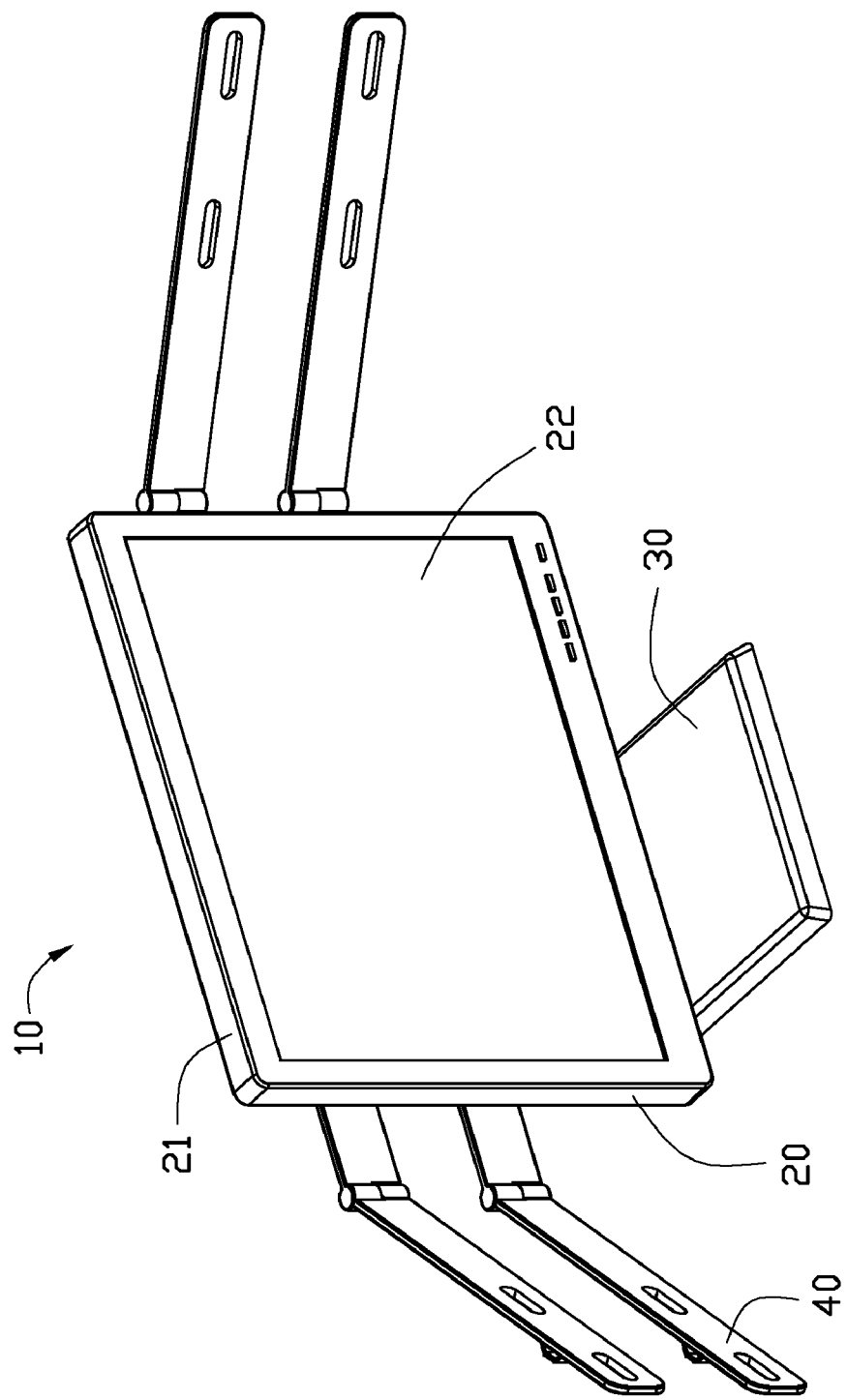
FIG. 1 is an isometric view of a first embodiment of a display, the display including brackets for screen expansion.
Figure 2:
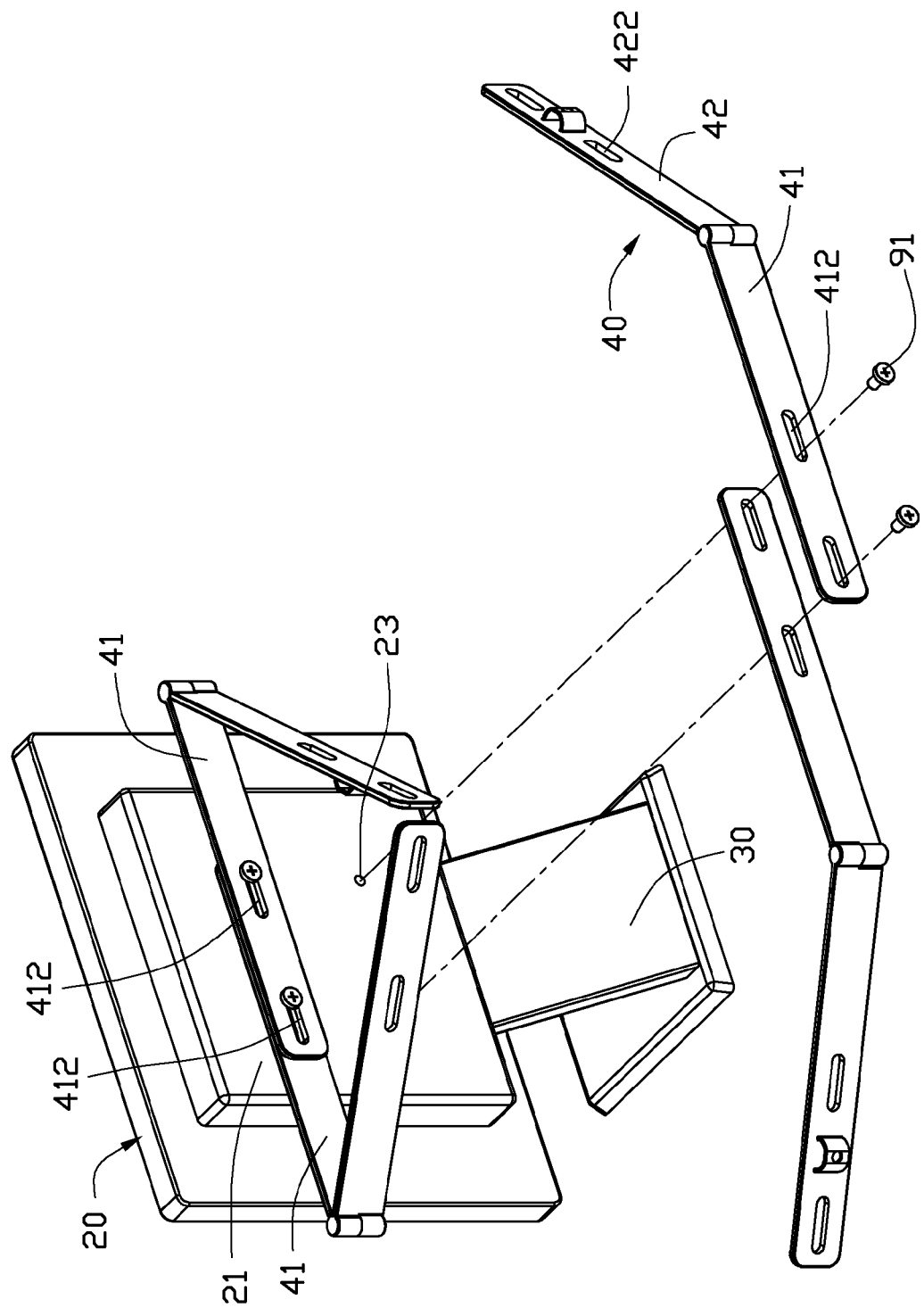
FIG. 2 is partially exploded view of the display of FIG. 1, but viewed from another perspective.

Referring to FIGS. 1 and 2, in a first embodiment, a display 10 includes a first display body 20, a stand 30, and four brackets 40 for screen expansion of the display 10.

The first display body 20 includes a frame 21 defining a substantially rectangular opening in a front surface of the frame 21. A screen 22 is accommodated in the opening. Four first mounting holes 23 are defined in a back surface of the frame 21. The first mounting holes 23 are arranged at four vertexes of a rectangle, respectively.

The stand 30 is mounted to a bottom of the frame 21, for supporting the first display body 20.

Figure 3:
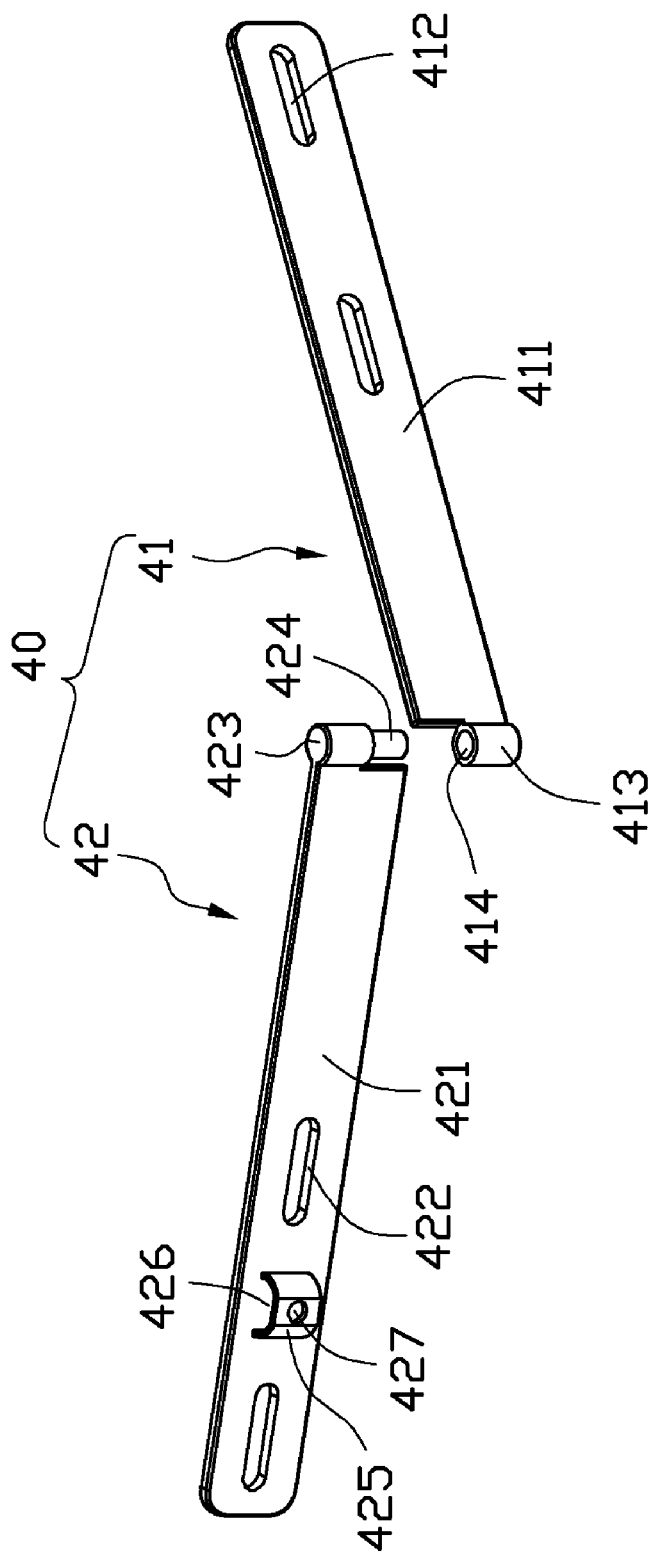
FIG. 3 is an exploded, isometric view of one of the brackets in FIG. 2.

Referring to FIG. 3, each bracket 40 includes a first arm 41, and a second arm 42.

The first arm 41 includes a first main body 411 extending substantially horizontally, and a first connecting portion 413 fixedly coupled to a first end of the first main body 411. Two spaced first assembling holes 412 are defined in the first main body 411, adjacent to a second end of the first main body 411 opposite to the first end, and are aligned along the extending direction of the first main body 411. Each first assembling hole 412 is elongated along the extending direction of the first main body 411. A pivot hole 414 is vertically defined in the first connecting portion 413.

The second arm 42 includes a second main body 421 extending substantially horizontally, and a second connecting portion 423 fixedly coupled to a first end of the second main body 421. Two spaced second assembling holes 422 are defined in the second main body 421, adjacent to a second end of the second main body 421 opposite to the first end, and are aligned along the extending direction of the second main body 421. Each second assembling hole 422 is elongated along the extending direction of the first main body 411. A first mounting portion 425 extends from the second main body 421 between the second assembling holes 422. A through hole 426 is vertically defined between the first mounting portion 425 and the second main body 421. A second mounting hole 427, communicating with the through hole 426, is defined in the first mounting portion 425, facing the second main body 421. A pole 424 extends vertically down from the second connecting portion 423.

Referring to FIG. 2 again, in assembling the display 10, two brackets 40 are taken as an example. The two first arms 41 of the two brackets 40 are attached to the back surface of the frame 21 of the first display body 20. The second ends of the first arms 41 are overlapped with each other. The two first assembling holes 412 of one of the first arms 41 are aligned with the two first assembling holes 412 of the other one of the first arms 41, respectively. Two fasteners 91, such as screws, are employed to extend through the aligned first assembling holes 412, respectively, and are engaged in the substantially horizontally spaced two of the first mounting holes 23 of the frame 21, respectively, so as to mount the two first arms 41 to the first display body 20. Wherein, the two first arms 41 are horizontally slidable relative to the fasteners 91, because the first assembling holes 412 are elongated. The poles 424 of the second arms 42 of the two brackets 40 are pivotally received in the pivot holes 414 of the corresponding first arms 41, respectively, so as to rotatably mount the second arms 42 to the first arms 41.

When the brackets 40 are not used, the brackets 40 may be retracted to the back of the frame 21 of the first display body 20. In detail, the first arms 41 may be slid with the first ends of the first arms 41 moving towards each other to increase an overlapping portion of the first arms 41, and the second arms 42 may be rotated to the back of the frame 21, to further shorten the brackets 40.

Figure 4:
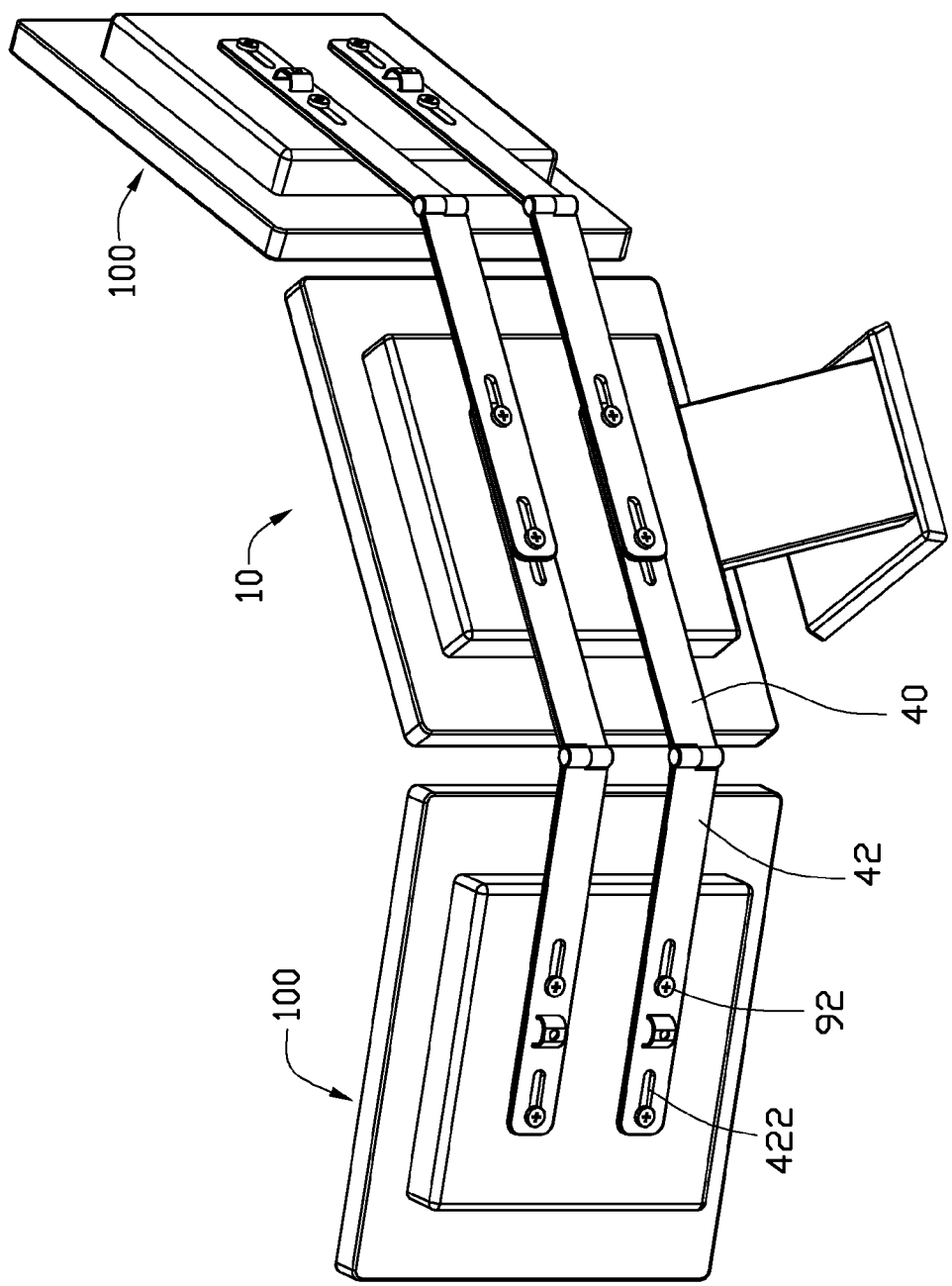
FIG. 4 is an assembled view of the display in FIG. 2, together with two extra display bodies.

Referring to FIG. 4, in using the brackets 40, the second arms 42 are pivoted to spread, and the first arms 41 are adjusted to decrease an overlapping portion of the first arms 41. Two second display bodies 100, are disposed at the left and right sides of the display 10, respectively. For each second display body 100, four fasteners 92 are extended through the second assembling holes 422 of the second arms 42 of the corresponding brackets 40, respectively, and engaged in four mounting holes (not labeled) in a back of the second display body 100, respectively. Therefore, each second display body 100 is mounted to the display 10 and is disposed at each corresponding side of the display 10.

In other embodiments, two of the brackets 40, which are located at a same height level, may be omitted from the display 10, if the remaining brackets 40 have enough load strength for mounting the second display bodies 100.

In other embodiments, slide action of the first arm 41 of each bracket 40 can alternatively be accomplished as follows. The first assembling holes 412 of the first arm 41 and the corresponding first mounting holes 23 of the frame 21 of the first display body 20 may be interchanged, which is the first assembling holes 412 may be defined in the first display body 20. The first mounting holes 23 may be defined in the first arm 41, and the corresponding fasteners 91 are assembled from an inside of the frame 21.

In other embodiments, the sliding function of the first arms 41 may not be needed. Upon that, the elongated first assembling holes 412 of the first arms 41 may be replaced by round holes, to cancel the sliding function of the first arms 41.

Figure 5:
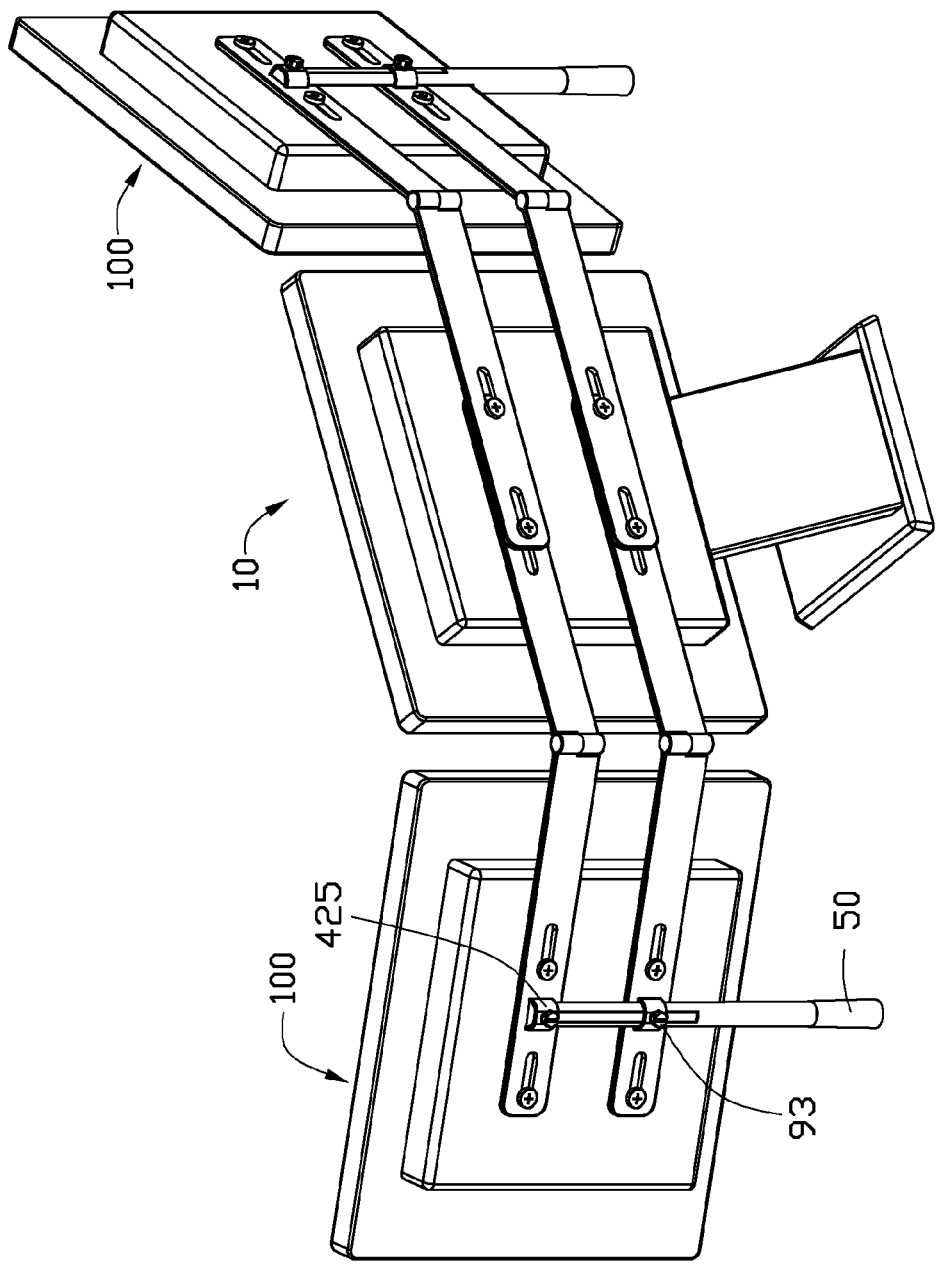
FIG. 5 is similar with FIG. 4, but with two support bars added.
Figure 6:
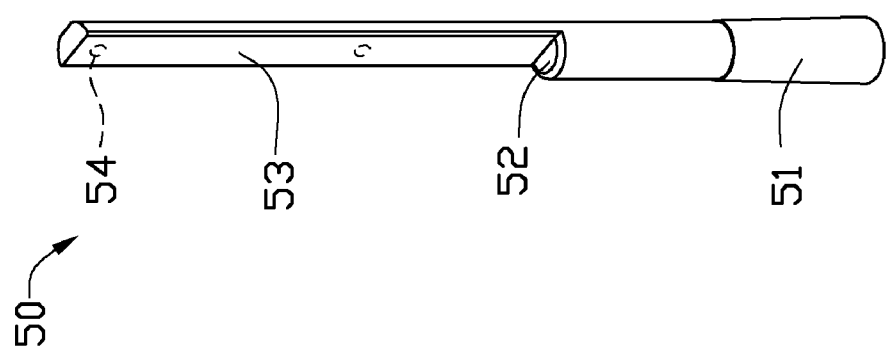
FIG. 6 is an isometric view of one of the support bars in FIG. 5.

Referring to FIGS. 5 and 6, further more, a support bar 50 may be added for each second display body 100 to supply additional support for each second display body 100. Each support bar 50 includes a supporting portion 51, and a second mounting portion 53. The supporting portion 51 is generally cylinder-shaped. A supporting surface 52 forms at a top of the supporting portion 51. The second mounting portion 53 extends upward from a first part of the supporting surface 52 of the supporting portion 51. The second mounting portion 53 has a shape corresponding to the shape of the through hole 426 of the first mounting portion 425 of each second arm 42. Two third mounting holes 54 are defined in the second mounting portion 53 corresponding to the second mounting holes 427 of two corresponding second arms 42. When installing each support bar 50, the second mounting portion 53 of the support bar 50 is extended in the through holes 426 of the first mounting portions 425 of the two corresponding second arms 42. While a second part of the supporting surface 52 of the support bar 50 is disposed to support a bottom of the corresponding second display body 100. Two fasteners 93 are extended through the second mounting holes 427 of the two corresponding second arms 42, respectively, and are engaged in the third mounting holes 54 of the support bar 50, to fix the support bar 50.

Figure 7:
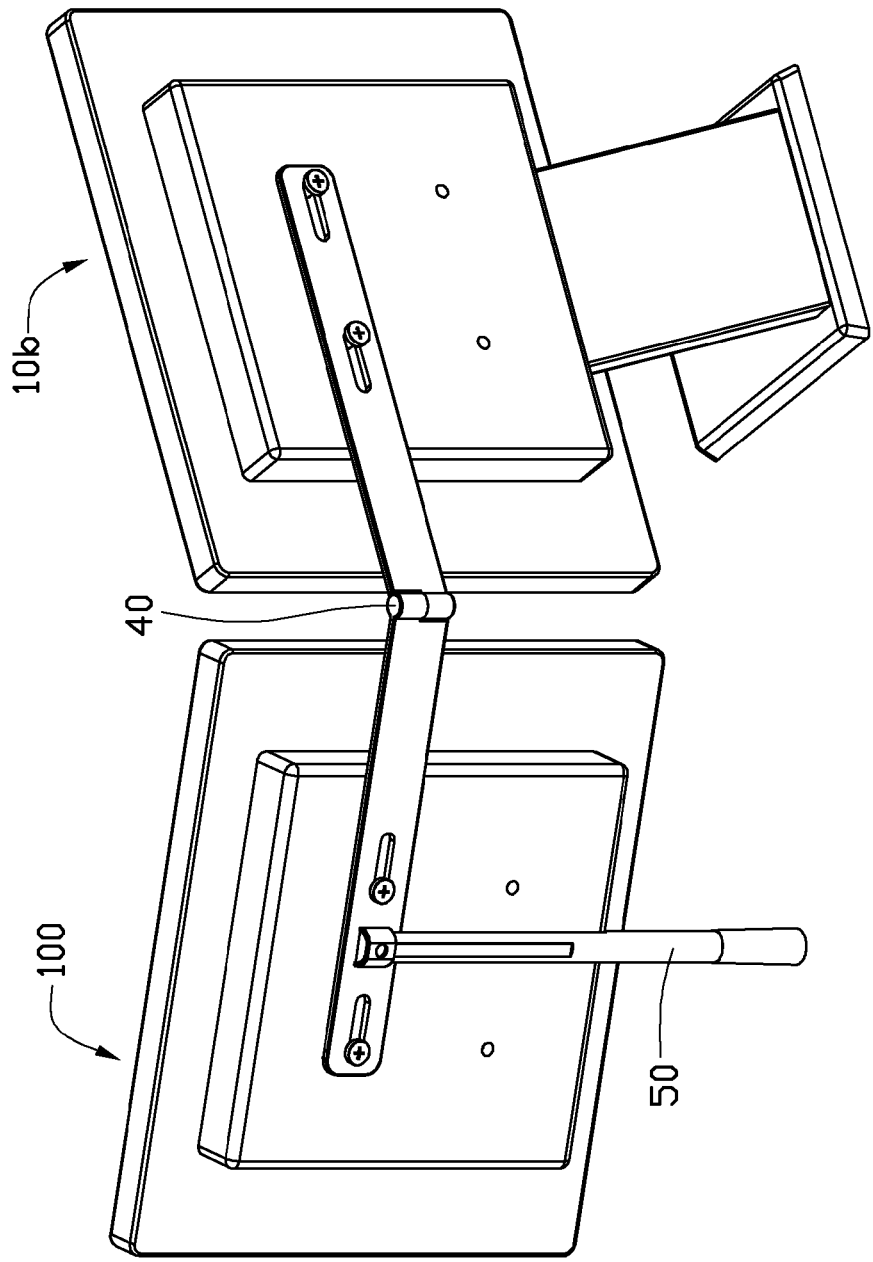
FIG. 7 is an assembled view of a second embodiment of a display together with one extra display body and a support bar.

Referring to FIG. 7, in a second embodiment of the present disclosure, only one bracket 40 is mounted to a display 10b for mounting only one second display body 100. Furthermore, one support bar 50 may be employed to assemble with the bracket 40 to supply further support for the second display body 100.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclose to the full extent indicated by the broad general meaning of the terms in which the appended claims are expressed.

What is claimed is:

1. A display assembly comprising:
   a first display body comprising a first frame defining a first opening in a front surface of the first frame, and a first screen accommodated in the first opening;
   a stand directly extending from a bottom of the first display body for supporting the first display body;
   a second display body comprising a second frame defining a second opening in a front surface of the second frame, and a second screen accommodated in the second opening;
   a bracket comprising:
      a first arm comprising a first main body extending substantially horizontally, wherein the first main body is mounted to a back surface of the first frame of the first display body; and
      a second arm comprising a second main body extending substantially horizontally, wherein the second main body is mounted to a back surface of the second frame of the second display body, the second arm is horizontally rotatably mounted to the first arm; and
   a support bar, wherein a first mounting portion extends from the second main body, a through hole is vertically bounded by the first mounting portion and the second main body, a second mounting hole is defined in the first mounting portion facing the second main body and communicating with the through hole, the support bar comprises a supporting portion, and a second mounting portion defining a third mounting hole corresponding to the second mounting hole of the second arm, wherein a supporting surface is formed at a top of the supporting portion and abuts against a bottom of the second frame, the second mounting portion extends from the top of the supporting portion into the through hole of the first mounting portion of the second arm, and a fastener is extended through the second mounting hole and engaged in the third mounting hole to fix the support bar to the second frame.

2. The display assembly of claim 1, wherein two horizontally spaced first mounting holes are defined in the back surface of the first frame, two horizontally spaced first assembling holes are defined in the first main body corresponding to the first mounting holes, two fasteners are extended through the second assembling holes, respectively, and are engaged in the corresponding first mounting holes of the first frame, to mount the first arm to the first frame.

3. The display assembly of claim 2, wherein the first assembling holes are elongated along the extending direction of the first main body, for slidably mounting the first arm by the corresponding fasteners.

4. The display assembly of claim 1, wherein two horizontally spaced second mounting holes are defined in the back surface of the second frame, two horizontally spaced second assembling holes are defined in the second main body corresponding to the second mounting holes, two fasteners are extended through the second assembling holes, respectively, and are engaged in the corresponding second mounting holes of the second frame, to mount the second arm to the second frame.

5. The display assembly of claim 4, wherein the second assembling holes are elongated along the extending direction of the second main body, for slidably mounting the second arm by the corresponding fasteners.

6. The display assembly of claim 1, wherein the first arm comprises a first connecting portion fixedly coupled to an end of the first main body, a pivot hole is vertically defined in the first connecting portion, the second arm comprises a second connecting portion fixedly coupled to an end of the second main body, a pole extends vertically down from the second connecting portion into the pivot hole to horizontally rotatably mount the second arm to the first arm.

* * * * *